United States Patent [19]

Swartz et al.

[11] Patent Number: 5,851,933
[45] Date of Patent: Dec. 22, 1998

[54] METHOD FOR MAKING FIBER GLASS MATS AND IMPROVED MATS USING THIS METHOD

[75] Inventors: Paul Russell Swartz, Perrysburg; George Nicholas Ello, Toledo, both of Ohio

[73] Assignee: Johns Manville International, Inc., Denver, Colo.

[21] Appl. No.: 528,284

[22] Filed: Sep. 14, 1995

[51] Int. Cl.⁶ .............................. B32B 5/16; B32B 17/06
[52] U.S. Cl. ......................... 442/180; 428/141; 428/143; 442/180; 442/331
[58] Field of Search ........................... 428/290; 442/100, 442/331

[56] References Cited

U.S. PATENT DOCUMENTS

| | | | |
|---|---|---|---|
| 4,571,356 | 2/1986 | White, Sr. et al. | 428/143 |
| 4,681,798 | 7/1987 | Gill et al. | 428/215 |
| 5,026,746 | 6/1991 | Floyd et al. | 524/50 |
| 5,116,890 | 5/1992 | Floyd et al. | 524/50 |
| 5,334,648 | 8/1994 | Drews et al. | 524/512 |
| 5,342,680 | 8/1994 | Randall | 428/285 |

*Primary Examiner*—Ana Woodward
*Attorney, Agent, or Firm*—Robert D. Touslee

[57] ABSTRACT

Methods for making nonwoven fibrous mats that produce superior tear strengths in roofing products, and the mats produced by the method, are disclosed. The mats comprise glass fiber bonded together with a dried and cured mixture of aqueous urea formaldehyde resin and a self crosslinking copolymer of vinyl acrylic or polyvinyl acetate.

7 Claims, No Drawings

METHOD FOR MAKING FIBER GLASS MATS AND IMPROVED MATS USING THIS METHOD

The present invention involves an improved modified urea formaldehyde type binder for bonding glass fibers together to form mats and the improved mats made in this manner. The mats produced according to this invention are useful as substrates for making a large number of products such as asphalt coated or saturated and modified bitumen coated or saturated roofing products such as shingles, roll roofing, cap sheet, etc. The mats are also useful as stabilizing and reinforcing substrates for various other products.

BACKGROUND

It is known to make reinforcing mats from glass fibers and to use these mats as substrates in the manufacture of a large number of roofing products such as shingles, built up roofing products, etc. Any known method of making nonwoven mats can be used, such as the conventional wet laid processes described in U.S. Pat. Nos. 4,112,174, 4,681,802 and 4,810,576, the disclosures of which are incorporated herein by reference. In these processes a slurry of glass fiber is made by adding glass fiber to a typical white water in a pulper to disperse the fiber in the white water forming a slurry having a fiber concentration of about 0.2–1.0 weight %, metering the slurry into a flow of white water and depositing this mixture on to a moving screen forming wire to dewater and form a wet nonwoven fibrous mat.

This wet nonwoven mat of glass fiber is then transferred to a second moving screen and run through a binder application saturating station where an aqueous binder mixture, such as an aqueous urea formaldehyde (UF) resin based binder mixture in water with about 24 weight percent, based on the dry weight of the UF resin, of a blend of 91.7 weight percent polyvinyl acetate homopolymer and 8.3 weight percent of an acrylic tripolymer, is applied to the mat. This is followed by sucking off the excess binder and drying the unbonded, wet mat and curing (polymerizing) the UF based resin binder which bonds the fibers together in the mat. Preferably, the aqueous binder solution is applied using a curtain coater or a dip and squeeze applicator, but other methods of application such as spraying will also work.

In the drying and curing oven the mat is subjected to temperatures of 250–450 or 500 degrees F. for periods usually not exceeding 1–2 minutes and as little as a few seconds. Alternative forming methods include the use of well known processes of cylinder forming and "dry laying" using carding or random fiber distribution.

UF resins are most commonly used as a binder for fiber glass mats because of their suitability for the applications and their relatively low cost. Melamine formaldehyde resins are sometimes used for higher temperature applications. To improve the toughness of the mats, a combination of higher mat tear strength and mat flexibility, which is needed to permit higher processing speeds on roofing product manufacturing lines and for maximum roofing product performance on the roofs, it is common to modify or plasticize the UF resins as described above or with acrylic latexes or SBR latexes.

Hundreds of millions of pounds of glass fiber mat have been made by the above known processes and have worked well. It is nevertheless desirable to simplify the mat process, to reduce costs and to improve the tear strength of roofing products still further. The present invention provides these advances in the industry.

SUMMARY OF THE INVENTION

In the conventional processes of making a nonwoven fiber mat by the processes described above wherein a slurry of fiber, preferably glass fiber, is metered into a stream of whitewater, preferably cationic to nonionic, and formed into a wet nonwoven mat on a moving, permeable surface and the mat is thereafter saturated and bound with an aqueous urea formaldehyde (UF) binder, preferably an aqueous UF binder in water and modified by mixing in polyvinyl acetate and acrylic tripolymer, excess binder removed and the mat is dried and cured. The present invention involves the improvement of using an aqueous self crosslinking vinyl acrylic copolymer as a modifier for the UF resin, and in amounts substantially less than was required using the conventional modifiers, to produce mats having comparable properties except that the mat of the present invention surprisingly produces substantially higher tear strength in the final roofing products than heretofore attained with mats bound with the conventionally modified UF resins. Roofing products containing the mats of the present invention have unexpectedly high tear strengths.

Preferably, the UF resin aqueous binder is modified or made by mixing in about 5–8 weight percent, preferably about 7–8 weight percent based on the dry weight of the UF resin and the dry weight of the modifier, of a self reactive and self cross linking vinyl acrylic copolymer having the following emulsion physical properties:

| | |
|---|---|
| Solids | about 49 Wt. percent |
| pH | about 4.2–5.0 |
| density | about 8.9 lbs./gal. |
| Glass Transition Temp. | about 22 degrees C. |
| Particle size | about 350 nanometers |
| Charge | Nonionic to slightly Cationic |
| Viscosity | 1000 to 3000 centipoise* |
| Colloid | Cellulosic |
| Borax Compatible | Yes |

*as measured on a Brookfield, Model LVF using a #4 spindle at 60 RPM at 77 degrees F.)

This modifier is available from Franklin International under the name Duracet® 827. It is mechanically stable and is stable to freeze/thaw conditions.

Another vinyl acrylic self-crosslinking copolymer suitable for use in the present invention is PN-3418-U Fulatex® Polymer manufactured by the H. B. Fuller Company of Vadnais Heights, Minn. This copolymer has the following characteristics;

Solids 45–47 weight percent

Viscosity 10–300 cps *

Ph4.5–5.5

Weight/gallon 8.9 lbs.

Residual Monomer 0.5 wt. percent max.

Appearance Milky white liquid

Average particle size less than 0.50 microns

Surfactant Nonionic

Surface Tension 40 Dynes/cm **

Mechanical Stability Excellent

Freeze—Thaw StabilityRecommend keeping above freezing temp.

* (Brookfield Model RVF at 20 RPM and 25 deg. C.)

** P. B. Tensiometer LG-60/40 E/W Dilution with water.

Another modifier that can be used in the present invention is an aqueous self-crosslinking polyvinyl acetate and acrylic copolymer identified as CDP 1790-194 available from Sequa Chemicals, Inc. of Chester, S.C. This material has the following characteristics:

| | |
|---|---|
| Ph | 6.5 |
| Percent solids (wt.) | 49.2 |
| Viscosity | 60 cps |
| Tg (glass transition temp.) | +30 degrees C. |

Amounts higher than 10 wt. percent, based on the weight of UF resin, can be used but add substantially to the cost and do not significantly improve the mat toughness or roofing product tear strength, at least in a cost effective manner.

The mat products made in accordance with the above described process are also considered a part of the present invention.

DETAILED DESCRIPTION OF THE INVENTION

The glass fibers which can be used to make mats can have various fiber diameters and lengths dependent on the strength and other properties desired in the mat as is well known. It is preferred that the majority of the glass fibers have diameters in the range of 3 to 20 microns, most preferably about 12 to 17 microns. Normally the glass fibers used all have about the same target length, such as 0.75, 1 or 1.25 inch, but fibers of different lengths and diameters can also be used to get different characteristics in a known manner. Fibers up to about 3 inches in length can be used in a wet process for making fiber glass mats and even longer fibers can be used in some dry processes. Generally the longer the fiber, the higher the tensile and strengths of the mat, but the poorer the fiber dispersion. While E, T and C type glass fibers are preferred for use in this invention, other types or glass fibers are also suitable, like A type, S type, etc. While the majority of the fibers used in the present invention are glass fibers, a minor portion of non glass fibers can also be used, such as up to about 25 wt. percent organic fibers such as Nylon®, polyester, polyethylene, polypropylene, etc.

Processes for making nonwoven fiber glass mats are well known and some of them are described in U.S. Pat. Nos. 4,112,174, 4,681,802 and 4,810,576, which references are hereby incorporated into this disclosure by reference, but any known method of making nonwoven mats can be used. The preferred technique for the making of mats of the present invention is forming a dilute aqueous slurry of fibers and depositing the slurry onto an inclined moving screen forming wire to dewater the slurry and form a wet nonwoven fibrous mat, on machines like a Hydroformer® manufactured by Voith-Sulzer of Appleton, Wis., or a Deltaformer® manufactured by Valmet/Sandy Hill of Glenns Falls, N.Y. Next, the wet, unbonded mat is transferred to a second moving screen running through a binder application saturating station where the modified UF resin based binder in aqueous solution is applied to the mat. The excess binder is removed, and the wet mat is transferred to a moving oven belt where the unbonded, wet mat is dried and cured, polymerizing the UF based resin binder bonding the fibers together in the mat. Preferably, the aqueous binder solution is applied using a curtain coater or a dip and squeeze applicator. In the drying and curing oven the mat is subjected to temperatures of 250–450 or 500 degrees F. for periods usually not exceeding 1 or 2 minutes and frequently less than 40 seconds. Alternative forming methods include the use of well known cylinder forming and "dry laying".

Any UF binder solution can be used but a preferred UF binder suitable for modification and use according to the present invention is an aqueous UF binder called GP 2928 manufactured by Georgia Pacific of Atlanta, Ga. which has the following approximate characteristics:

| | |
|---|---|
| Solids as received | 54–56 wt. percent |
| Viscosity | 85–200 centipoise |
| pH | 6.7–7.9 |
| Specific Gravity | 1.22–1.24 |
| Free Formaldehyde | 0.5 wt. percent max. (this property is not critical to the performance of the resin, but is desirable from an environmental standpoint). |

EXAMPLE 1

A fiber slurry was prepared in a well known manner by adding one inch long wet E type glass chopped fiber having fiber diameters averaging about 16 microns to a known cationic white water containing Natrosol® thickening agent available from Hercules, Inc. and a cationic surfactant C-61, an ethoxylated tallow amine available from Cytec Industries, Inc. of Morristown, N.J., as a dispersing agent to form a fiber concentration of about 0.8 weight percent. After allowing the slurry to agitate for about 20 minutes to thoroughly disperse the fibers, the slurry was metered into a moving stream of the same whitewater to dilute the fiber concentration about 5 to 10 times to a concentration averaging about 0.05 to 0.06 weight percent before pumping the diluted slurry to a headbox of a Voith Hydroformer® where a wet nonwoven mat was continuously formed. The wet mat was removed from the forming wire and transferred to a Sandy Hill Curtain Coater where an aqueous UF binder (the Georgia Pacific UF described above), modified with (mixed with) about 24 weight percent, based on the dry weight of the UF resin, of a blend of 91.7 weight percent polyvinyl acetate homopolymer and 8.3 weight percent of an acrylic tripolymer, was applied in an amount to provide a binder level in the cured mat of about 19–20 weight percent. The wet mat was then transferred to an oven belt and carried through an oven to dry the mat and cure the modified UF resin to a temperature of about 450 degrees F. The basis weight of the mat produced was 8.7 grams per square foot and the mat had the following strength properties:

| | |
|---|---|
| Thickness | 32–33 mils |
| Loss On Ignition | 19.5–21 weight percent |
| Machine Direction Tensile | 109 lbs./3 inches |
| Cross Machine Direction Tensile | 80 lbs./3 inches |
| Machine Direction Tear Strength | 500 grams |
| Cross Machine Dir. Tear Strength | 600 grams |

This mat has been used to make asphalt coated shingles and roll roofing for many years.

EXAMPLE 2

Another mat was made in exactly the same way as in Example 1, except that the binder applied to the wet nonwoven mat was the same aqueous Georgia Pacific UF resin binder used in Example 1, but modified, mixed with, about 10 weight percent of the Franklin Chemical Company's Duraset® 827 self-crosslinking vinyl acrylic copolymer. This mat had a basis weight of 8.7 grams per square foot and the following physical properties:

| | |
|---|---|
| Thickness | 32–33 mils |
| Loss On Ignition | 19.5–21 weight percent |
| Machine Direction Tensile | 106 lbs./3 inch |
| Cross Machine Tensile | 77 lbs./3 inch |
| Machine Direction Tear Strength | 600 grams |
| Cross Machine Direction Tear Strength | 680 grams |

The mat made in Examples 1 and 2 above were used to make asphalt coated shingles in a known process. When the mat from both above Examples were made into the same type of shingles on the same line using the same technique and materials other than mat type, the shingles had the following total tear strengths, i. e. machine direction tear strength plus cross machine direction tear strength:

Total tear using Example 1 mat—3200–3500 grams

Total tear using Example 2 mat—4000–4200 grams

EXAMPLES 3 and 4

Example 1 were duplicated with the exception that the basis weight of the mat was increased to 9.7 grams per square foot to make a mat identified as Example 3 mat. Mat was also made according to the same conditions of Example 2, except that only 75 weight percent of the Duraset® 827 was mixed with the GP 2928 UF resin to make the binder for the mat and the basis weight of the finished mat was increased to 9.7 grams per square foot to make mat identified as Example 4.

The conventional and inventive mats made in Examples 3 and 4 were used to make asphalt coated shingles in a known process, but different than the process used to evaluate mats from Examples 1 and 2. When the mats made in Examples 3 and 4 were made into the same type of shingles on the same line using the same technique and materials other than mat type, the shingles had the following cross machine direction tear strengths:

CMD tear strength using Example 3 mat—2200 grams

CMD tear strength using Example 4 mat—2700 grams

The higher shingle tears produced by the mat of the present invention were unexpected and are very valuable to the mat and roofing industry since it will permit new alternatives of stronger roofing products and/or lighter weight and less expensive roofing products, and/or lighter weight and lower cost mat products.

In addition to the higher tear performance produced by this invention there are other benefits also. Only one modifier material must now be received, transported, stored and added instead of two materials used before this invention. This reduces equipment and labor costs and reduces chances of error. Also, much less volume of modifier must be stored than before.

While the preferred embodiments of the invention have been disclosed in detail, other embodiments within the described invention and having other functional additives known or obvious to those skilled in the art are considered as part of the present invention and are intended to be included in the invention claimed below.

We claim:

1. In a method of making a fiber glass mat wherein an aqueous mixture comprising a modified urea formaldehyde resin binder is applied to a wet, nonwoven mat of unbonded glass fibers saturating the wet mat, excess binder is removed, and said mat containing said binder is dried and said resin binder is cured to form a modified urea formaldehyde bonded glass fiber mat, the improvement comprising modifying the aqueous urea formaldehyde binder by adding 5–8 weight percent modifier, based on the dry weights of the urea formaldehyde resin and the modifier, to the aqueous urea formaldehyde resin binder before applying this binder mixture to said wet nonwoven mat, the modifier selected from the group consisting of an aqueous self-crosslinking vinyl acrylic copolymer emulsion having a pH in the range of 4.2–5.5 and being nonionic to slightly cationic and an aqueous self-crosslinking vinyl acetate and acrylic copolymer having a glass transition temperature of +30 degrees C.

2. The method of claim 1 wherein said fiber glass mat is formed from a wet process, said mat contains a cationic whitewater from the process when said modified UF resin is applied, and wherein excess binder and whitewater are removed from said mat before drying said mat.

3. The method of claim 2 wherein about 7–8 wt. percent of said copolymer is added to said UF binder prior to application of said binder to said mat.

4. The method of claim 1 wherein about 7–8 wt. percent of said copolymer is added to said UF binder prior to application of said binder to said mat.

5. The method of any one of claims 1, 2, 3 and 4 wherein said copolymer has the following characteristics:

| | |
|---|---|
| pH | about 4.2–5.5 |
| average particle size | less than .5 micron |
| Charge | nonionic to slightly cationic. |

6. A mat producing unexpectedly high tear strength in asphalt or modified bitumen roofing products comprising glass fibers bonded together with a urea formaldehyde resin binder containing a modifier wherein said modifier is an aqueous substance selected from the group consisting of a self-crosslinking vinyl acrylic copolymer emulsion having a pH in the range of 4.2–5.5 and being nonionic to slightly cationic and an aqueous self-crosslinking vinyl acetate and acrylic copolymer having a glass transition temperature of +30 degrees C. and a pH of about 6.5 present in amounts of 5–8 weight percent, based on the dry weights of the urea formaldehyde resin and the modifier.

7. The mat of claim 6 wherein said copolymer is present in amounts of 7–8 weight percent.

* * * * *